(12) United States Patent
Wang

(10) Patent No.: US 12,146,521 B2
(45) Date of Patent: Nov. 19, 2024

(54) ASSEMBLING METHOD OF ANTI-ROTATION STRUCTURE

(71) Applicant: FIVEGRAND INTERNATIONAL CO., LTD., New Taipei (TW)

(72) Inventor: Ting-Jui Wang, New Taipei (TW)

(73) Assignee: FIVEGRAND INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 18/426,371

(22) Filed: Jan. 30, 2024

(65) Prior Publication Data

US 2024/0328452 A1 Oct. 3, 2024

(30) Foreign Application Priority Data

Mar. 31, 2023 (TW) ................................. 112112500

(51) Int. Cl.
*F16B 39/28* (2006.01)
*F16B 37/06* (2006.01)

(52) U.S. Cl.
CPC .................................... *F16B 39/28* (2013.01)

(58) Field of Classification Search
CPC .......... F16B 39/28; F16B 37/068; F16B 37/06
See application file for complete search history.

(56) References Cited

U.S. PATENT DOCUMENTS

| | | | | |
|---|---|---|---|---|
| 4,370,794 A | * | 2/1983 | Bien | F16B 37/068 |
| | | | | 29/520 |
| 8,021,091 B2 | * | 9/2011 | Bentrim | F16B 37/068 |
| | | | | 411/533 |
| 8,096,743 B2 | * | 1/2012 | Babej | F16B 37/068 |
| | | | | 411/188 |
| 8,931,990 B2 | * | 1/2015 | Gardstam | B23P 19/062 |
| | | | | 411/180 |
| 10,794,417 B2 | * | 10/2020 | Hirschmann | F16B 37/068 |
| 11,209,040 B2 | * | 12/2021 | O'Donnell | F16B 37/068 |
| 11,353,052 B2 | * | 6/2022 | Wang | F16B 4/004 |

* cited by examiner

*Primary Examiner* — Bayan Salone

(57) ABSTRACT

An assembling method of an anti-rotation structure is introduced, the anti-rotation structure includes at least one anti-rotation portion, a material entering portion and a pressure applying portion, pressure is applied to the pressure applying portion by an external force, so that material of an object enters or flows into the material entering portion, and the anti-rotation portion is used to anti-rotate with the object. Accordingly, the anti-rotation structure and the required object can achieve the effect of a stable combination.

8 Claims, 9 Drawing Sheets

ASSEMBLING METHOD OF ANTI-ROTATION STRUCTURE

CROSS-REFERENCE TO RELATED APPLICATION

This non-provisional application claims priority under 35 U.S.C. § 119(a) on Patent Application No(s). 112112500 filed in Taiwan, R.O.C. on Mar. 31, 2023, the entire contents of which are hereby incorporated by reference.

BACKGROUND OF THE INVENTION

1. Field of the Invention

The present disclosure provides an assembling method of an anti-rotation structure, and in particular an assembling method of an anti-rotation structure that can make the anti-rotation structure and the required object firmly combined.

2. Description of the Related Art

Generally, when combining at least one object, it is usually achieved by locking with buckles to combine the object, but because of the structural design of the buckle, it is often occurred that the object is unstable and loose after combination.

BRIEF SUMMARY OF THE INVENTION

In view of the above prior art, the inventor developed an assembling method of an anti-rotation structure, with a view to achieving the purpose that can provide the anti-rotation structure and the required object to be firmly combined.

To achieve the above objective and other objectives, the present disclosure provides an assembling method of an anti-rotation structure, the anti-rotation structure includes at least one anti-rotation portion, a material entering portion and a pressure applying portion, pressure is applied to the pressure applying portion by an external force, so that material of an object enters or flows into the material entering portion, and the anti-rotation portion is used to anti-rotate with the object.

In the above assembling method of the anti-rotation structure, the material entering portion is provided with a prevention portion, the prevention portion is used to prevent the material of the object from flowing out, protruding, overflowing, extruding from the material entering portion or restrict a storage position of the material of the object.

In the above assembling method of the anti-rotation structure, the pressure applying portion is greater than the material entering portion and the prevention portion, the prevention portion is greater than the material entering portion, the scope of the anti-rotation portion covers a part of the pressure applying portion, the material entering portion, the prevention portion or a part of the prevention portion.

In the above assembling method of the anti-rotation structure, the anti-rotation structure is provided with a connecting portion, the connecting portion is a threaded portion, a stud, a cylinder, an outer fastening member, an inner fastening member, a hole portion or a groove portion, a screw hole, a wheel, a round member, a sphere member, a gear, a handle, a bolt member, a lifting member or a movable member.

In the above assembling method of the anti-rotation structure, the anti-rotation structure is first disposed at the object with the material entering portion, and then an element is combined to a connecting portion of the anti-rotation structure, wherein the element and the connecting portion produce a force when combined.

In the above assembling method of the anti-rotation structure, the anti-rotation structure is first disposed at the object with the material entering portion, and then an element is combined to a connecting portion of the anti-rotation structure, wherein the connecting portion is a threaded portion, the element and the connecting portion produce a force when combined by rotationally locking, and the force is resisted with the anti-rotation portion, so that the anti-rotation structure can achieve anti-rotation.

In the above assembling method of the anti-rotation structure, the anti-rotation structure is first disposed at the object with the material entering portion, and then an element is combined to a connecting portion of the anti-rotation structure by fastening or abutting, wherein the element and the connecting portion produce a force when combined by fastening or abutting, and the force is resisted with the anti-rotation portion of the anti-rotation structure.

In the above assembling method of the anti-rotation structure, the number of the anti-rotation portion is one or more.

In the above assembling method of the anti-rotation structure, the anti-rotation structure is an arc member, a spherical member, a stepped member, an inclined member, a cone member, a curved member, a sectional member, a convex member, a concave member or a plane member.

In the above assembling method of the anti-rotation structure, the anti-rotation structure is put into the object with the anti-rotation portion, and the pressure is applied to the pressure applying portion, so that the pressure applying portion is deformed to be limited or engaged at the object.

In the above assembling method of the anti-rotation structure, the anti-rotation structure is first disposed at the corresponding anti-rotation portion of the object with the anti-rotation portion, and then the pressure is applied to the pressure applying portion, so that the pressure applying portion is deformed to be limited or engaged at the object.

In the above assembling method of the anti-rotation structure, the anti-rotation portion is provided above the pressure applying portion, or the anti-rotation portion is provided below the pressure applying portion, or the anti-rotation portion is provided on the same plane as the pressure applying portion, or the anti-rotation portion is provided above the material entering portion, or the anti-rotation portion is provided below the material entering portion, or the anti-rotation portion is provided on the same plane as the material entering portion, or the material entering portion is provided above the pressure applying portion, or the material entering portion is provided below the pressure applying portion, or the material entering portion is provided on the same plane as the pressure applying portion.

Accordingly, the assembling method of the anti-rotation structure of the present disclosure can provide the anti-rotation structure and the required object to achieve the effect of a stable combination.

DETAILED DESCRIPTION OF THE INVENTION

To facilitate understanding of the purpose, characteristics and effects of the present disclosure, embodiments together with the attached drawings for the detailed description of the present disclosure are provided as below.

Figure 1:
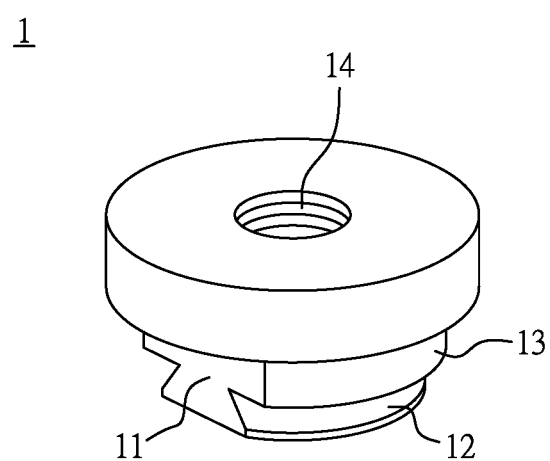
FIG. 1 is a schematic perspective view of a first embodiment of the present disclosure.
Figure 2:
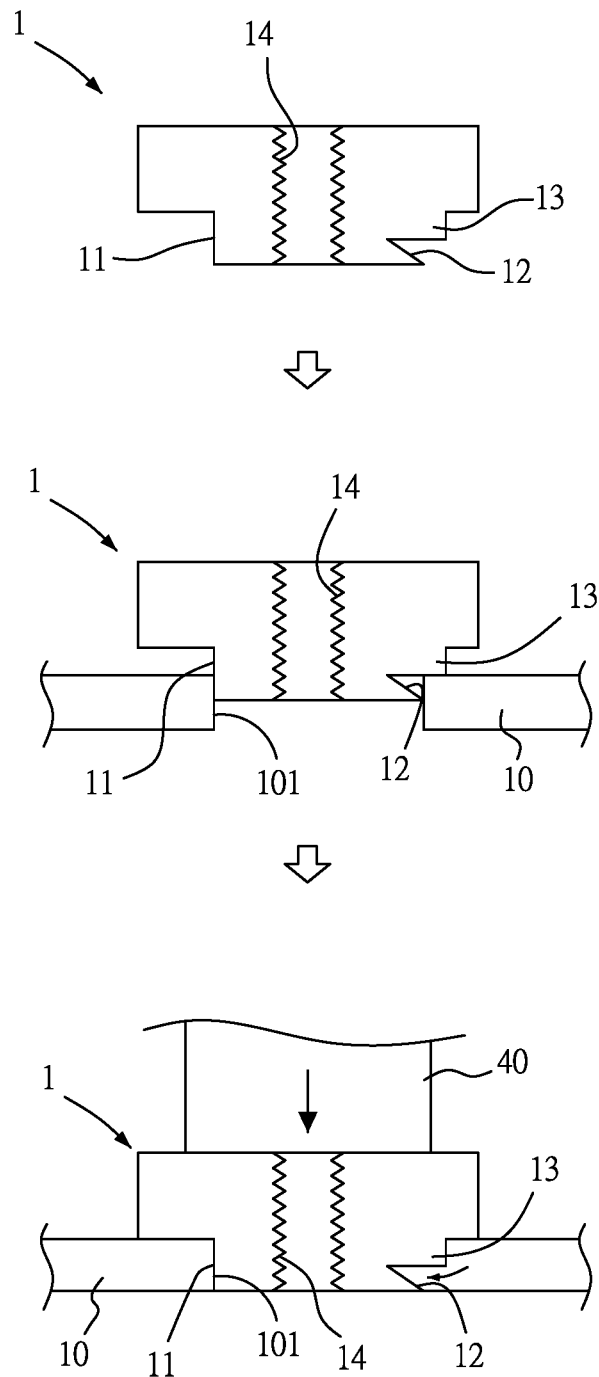
FIG. 2 is a schematic view of an assembling state of the first embodiment of the present disclosure.

Referring to FIGS. 1 to 2, the present disclosure provides an assembling method of an anti-rotation structure, the anti-rotation structure 1 includes at least one anti-rotation portion 11, a material entering portion 12 and a pressure applying portion 13, the anti-rotation portion 11 is disposed at a part below the anti-rotation structure 1 (for example, at one side), the material entering portion 12 is circularly disposed below the anti-rotation structure 1, and the pressure applying portion 13 is circularly disposed below the anti-rotation structure 1 and corresponds to the material entering portion 12; a tool 40 can be used to apply pressure to the pressure applying portion 13 by an external force, so that material of an object 10 enters or flows into the material entering portion 12, and the object 10 is anti-rotated with the anti-rotation portion 11.

In addition to the above embodiment, in one embodiment of the present disclosure, the anti-rotation structure 1 is provided with a connecting portion 14, the connecting portion 14 can be combined with another element, the connecting portion 14 of the present embodiment is a threaded portion (such as a screw hole) that penetrates the anti-rotation structure 1, when used, the anti-rotation structure 1 can first be disposed at the object 10 with the material entering portion 12, and then an element is combined with the connecting portion 14 of the anti-rotation structure 1, wherein the element and the connecting portion 14 can produce a force (for example: torsion, thrust, forward thrust, side thrust, torsion or shear force) when combined, so that the anti-rotation structure 1 can resist the force with the anti-rotation portion 11; in this way, the anti-rotation structure 1 of the present disclosure can further meet the needs of practical application.

In addition to the above embodiment, in one embodiment of the present disclosure, the connecting portion 14 may be a stud, a cylinder, an outer fastening member, an inner fastening member, a hole portion or a groove portion to be combined with another element; in addition, the connecting portion 14 may also be a wheel, a round member, a sphere member, a gear, a handle, a bolt member, a lifting member or a movable member to be combined with the anti-rotation structure 1, so that the present disclosure can further meet the needs of practical application.

In addition to the above embodiment, in one embodiment of the present disclosure, the anti-rotation structure 1 may be an arc member, a spherical member, a stepped member, an inclined member, a cone member, a curved member, a sectional member, a convex member, a concave member or a plane member; the anti-rotation structure 1 of such different types can make the present disclosure further meet the needs of practical application.

In addition to the above embodiment, in one embodiment of the present disclosure, the number of the anti-rotation portion 11 is one or more, but in practical application, the number of the anti-rotation portion 11 may be more than one, so that the present disclosure can further meet the needs of practical application.

In addition to the above embodiment, in one embodiment of the present disclosure, the anti-rotation portion 11, the material entering portion 12 and the pressure applying portion 13 may be provided at different positions of the anti-rotation structure 1 according to actual needs. For example, the anti-rotation portion 11 is provided above the pressure applying portion 13, or the anti-rotation portion 11 is provided below the pressure applying portion 13, or the anti-rotation portion 11 is provided on the same plane as the pressure applying portion 13, or the anti-rotation portion 11 is provided above the material entering portion 12, or the anti-rotation portion 11 is provided below the material entering portion 12, or the anti-rotation portion 11 is provided on the same plane as the material entering portion 12, or the material entering portion 12 is provided above the pressure applying portion 13, or the material entering portion 12 is provided below the pressure applying portion 13, or the material entering portion 12 is provided on the same plane as the pressure applying portion 13, so that the present disclosure can further meet the needs of practical application.

Figure 3:
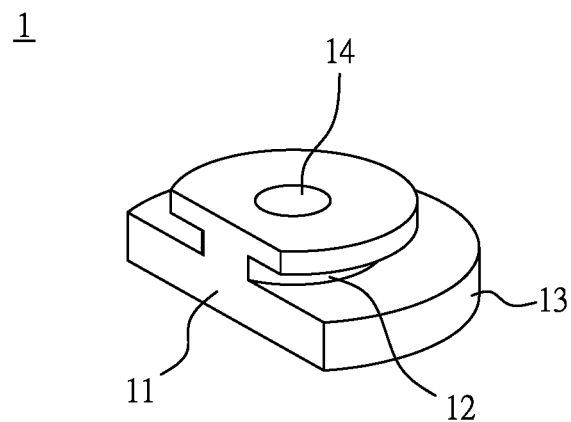
FIG. 3 is a schematic perspective view of a second embodiment of the present disclosure.
Figure 4:
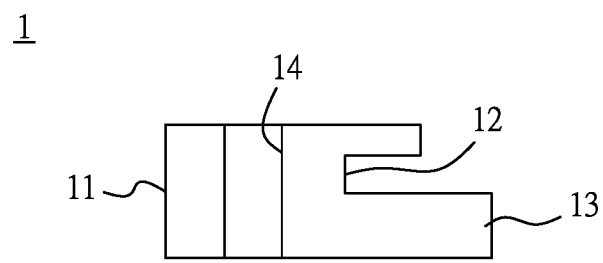
FIG. 4 is a schematic view of a sectional state of the second embodiment of the present disclosure.
Figure 5:
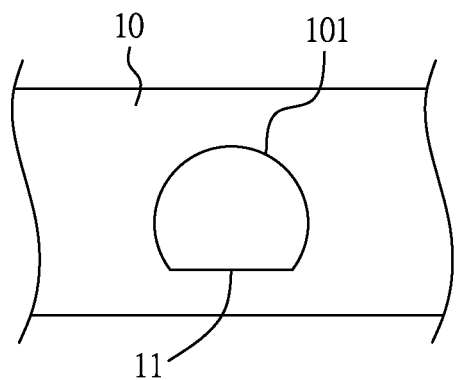
FIG. 5 is a schematic view of an assembling state of the second embodiment of the present disclosure.
Figure 6:
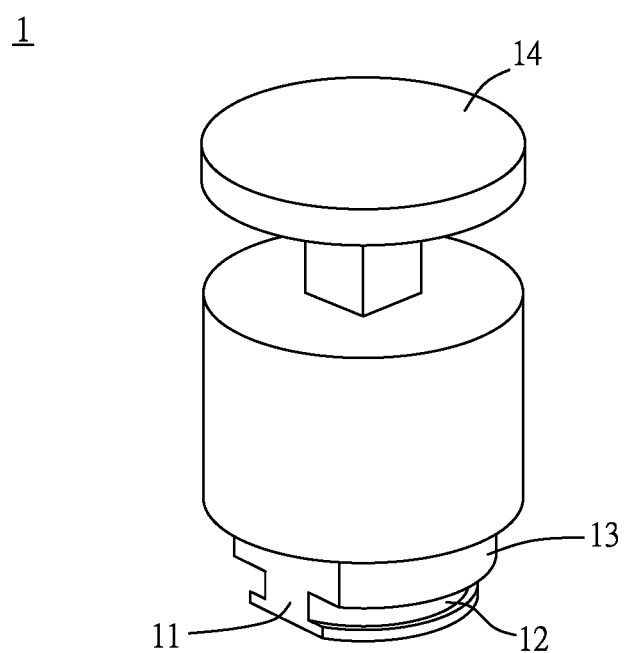
FIG. 6 is a schematic perspective view of a third embodiment of the present disclosure.
Figure 7:
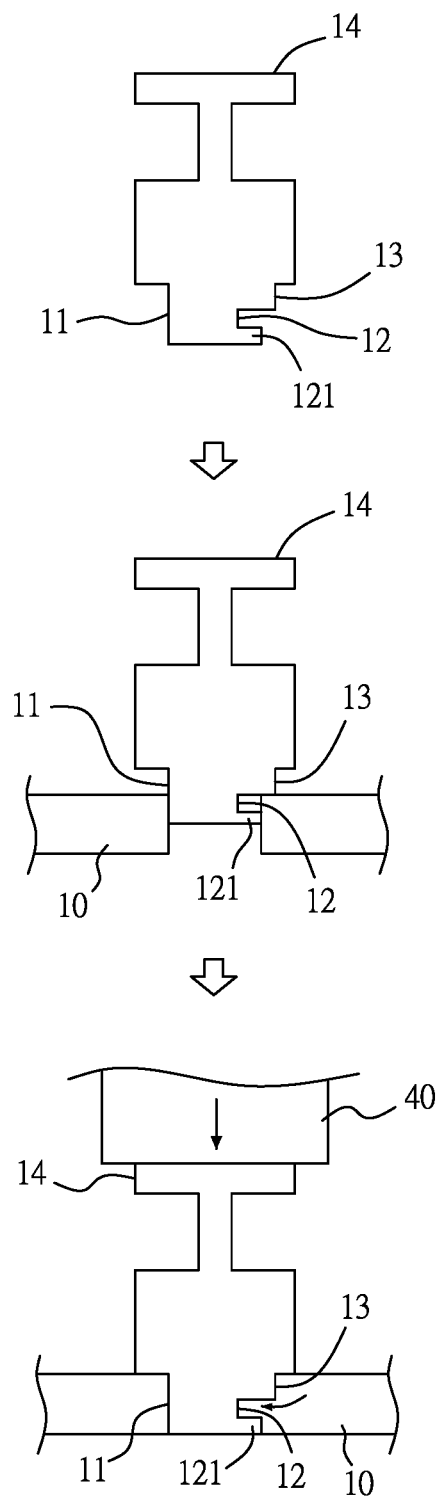
FIG. 7 is a schematic view of an assembling state of the third embodiment of the present disclosure.
Figure 8:
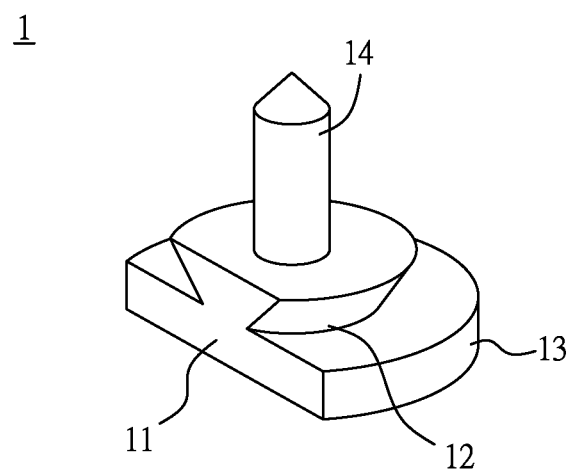
FIG. 8 is a schematic perspective view of a fourth embodiment of the present disclosure.
Figure 9:
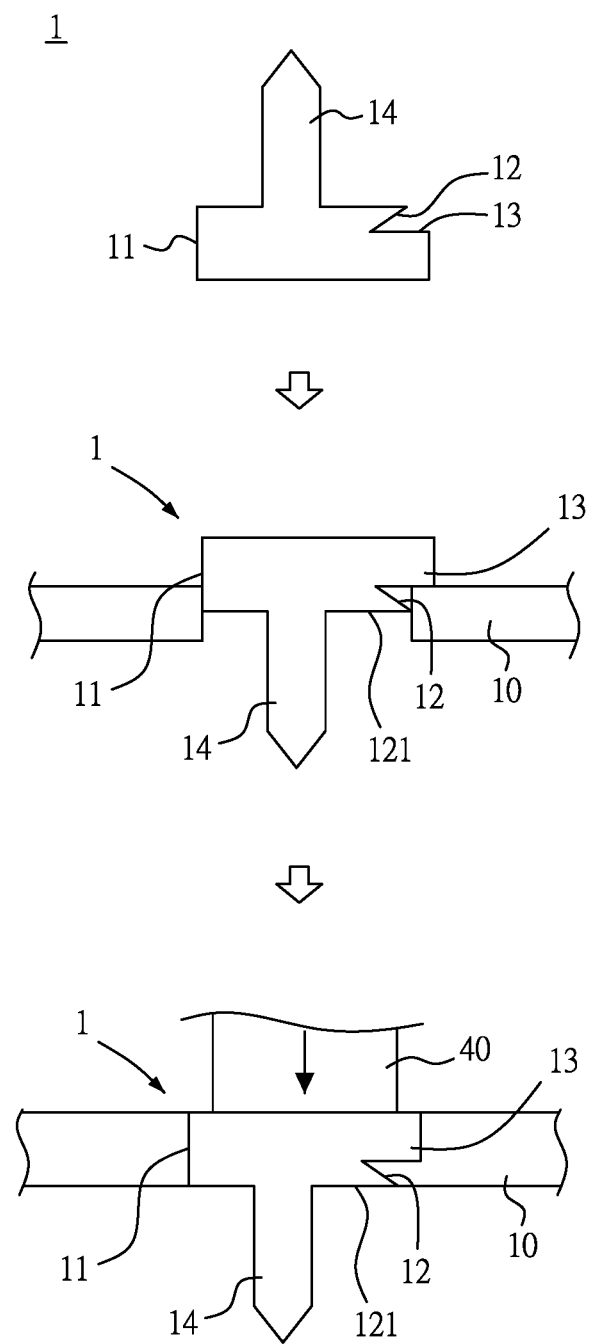
FIG. 9 is a schematic view of an assembling state of the fourth embodiment of the present disclosure.

Referring to FIG. 3 to FIG. 5, in addition to the above embodiment, in one embodiment of the present disclosure, the anti-rotation structure 1 is disposed at a corresponding anti-rotation portion 101 of the object 10 with the anti-rotation portion 11, and the pressure is applied to the pressure applying portion 13 with the tool 40 so that the material of the object 10 enters or flows into the material entering portion 12, and the anti-rotation portion 11 is used to mutually anti-rotate with the corresponding anti-rotation portion 101 of the object 10, so that the anti-rotation structure 1 is firmly disposed at the object 10.

As shown in FIG. 6 to FIG. 9, in addition to the above embodiment, in one embodiment of the present disclosure, it differs from the above embodiment in that the material entering portion 12 is provided with a prevention portion 121; the anti-rotation structure 1 can be disposed at the corresponding anti-rotation portion 101 of the object 10 with the anti-rotation portion 11, and pressure can be applied to the pressure applying portion 13 to make the material of the object 10 enter or flow into the material entering portion 12, and the prevention portion 121 is used to prevent the material of the object 10 from flowing out, protruding, overflowing, extruding from the material entering portion 12 or restrict a storage position of the material of the object 10, and the anti-rotation portion 11 is used to mutually anti-rotate with the corresponding anti-rotation portion 101 of the object 10, so that the anti-rotation structure 1 is firmly disposed at the object 10.

Figure 10:
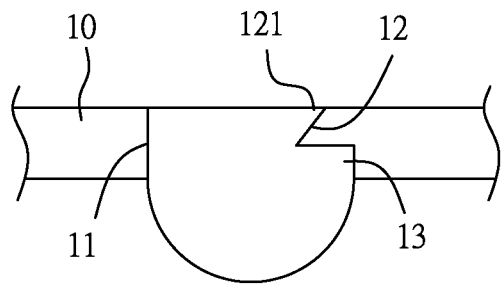
FIG. 10 is a schematic view of an assembling state of a fifth embodiment of the present disclosure.

As shown in FIG. 10, in addition to the above embodiment, in one embodiment of the present disclosure, it differs from the above embodiment in that the anti-rotation structure 1 of the present embodiment may be an arc member, and the pressure applying portion 13 is greater than the material entering portion 12 and the prevention portion 121, the prevention portion 121 is greater than the material entering portion 12, the scope of the anti-rotation portion 11 covers a part of the pressure applying portion 13, the material entering portion 12, the prevention portion 121 or a part of the prevention portion 121 (such as being disposed at one side); the anti-rotation structure 1 can be disposed at the corresponding anti-rotation portion 101 of the object 10 with the anti-rotation portion 11, and pressure can be applied to the pressure applying portion 13 to make the material of the object 10 enter or flow into the material entering portion 12, and the prevention portion 121 is used to prevent the material of the object 10 from flowing out, protruding, overflowing, extruding from the material entering portion 12 or restrict a storage position of the material of the object 10, and the anti-rotation portion 11 is used to mutually anti-rotate with the corresponding anti-rotation portion 101 of the object 10, so that the anti-rotation structure 1 is firmly disposed at the object 10.

Figure 11:
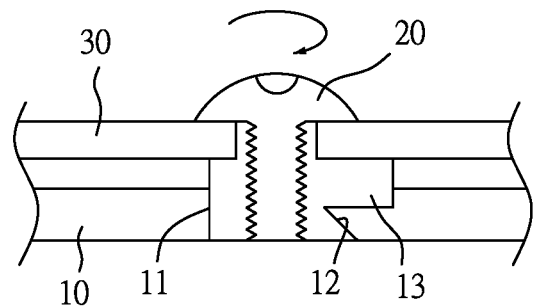
FIG. 11 is a schematic view of an assembling state of a sixth embodiment of the present disclosure.

As shown in FIG. 11, in addition to the above embodiment, in one embodiment of the present disclosure, the anti-rotation structure 1 can be first disposed at the object 10 with the material entering portion 12, and pressure can be applied to the pressure applying portion 13 to make the material of the object 10 enter or flow into the material entering portion 12, and the anti-rotation portion 11 is used to mutually anti-rotate with the corresponding anti-rotation portion 101 of the object 10, so that the anti-rotation structure 1 is firmly disposed at the object 10; after that, an element 20 is combined to the connecting portion 14 of the anti-rotation structure 1, so that a fastened object 30 is combined to the anti-rotation structure 1 by the element 20, wherein the connecting portion 14 is a threaded portion, the element 20 is a screw, the element 20 and the connecting portion 14 can produce a force (for example: torsion) when combined by rotationally locking, and the force is resisted with the anti-rotation portion 11, so that the anti-rotation structure 1 can achieve anti-rotation, and thus the fastened object 30 cooperates with the element 20 to be firmly disposed at the anti-rotation structure 1.

Figure 12:
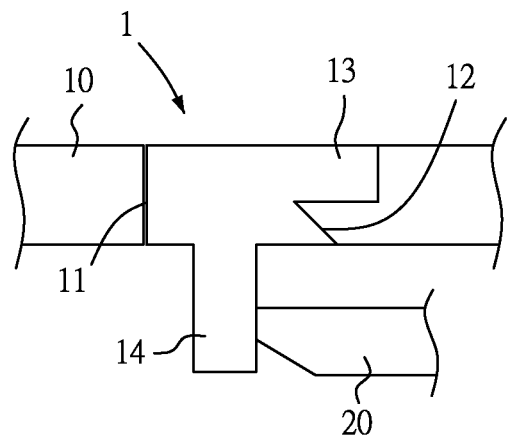
FIG. 12 is a schematic view of an assembling state of a seventh embodiment of the present disclosure.

As shown in FIG. 12, in addition to the above embodiment, in one embodiment of the present disclosure, the anti-rotation structure 1 can be first disposed at the object 10 with the material entering portion 12, and pressure can be applied to the pressure applying portion 13 to make the material of the object 10 enter or flow into the material entering portion 12, and the anti-rotation portion 11 is used to mutually anti-rotate with the corresponding anti-rotation portion 101 of the object 10, so that the anti-rotation structure 1 is firmly disposed at the object 10; after that, an element 20 is combined to the connecting portion 14 of the anti-rotation structure 1 by fastening or abutting, wherein the element 20 and the connecting portion 14 can produce a force (for example: thrust) when combined by fastening or abutting, and the force is resisted with the anti-rotation portion 11 of the anti-rotation structure 1, so that the present disclosure can further meet the needs of practical application.

Figure 13:
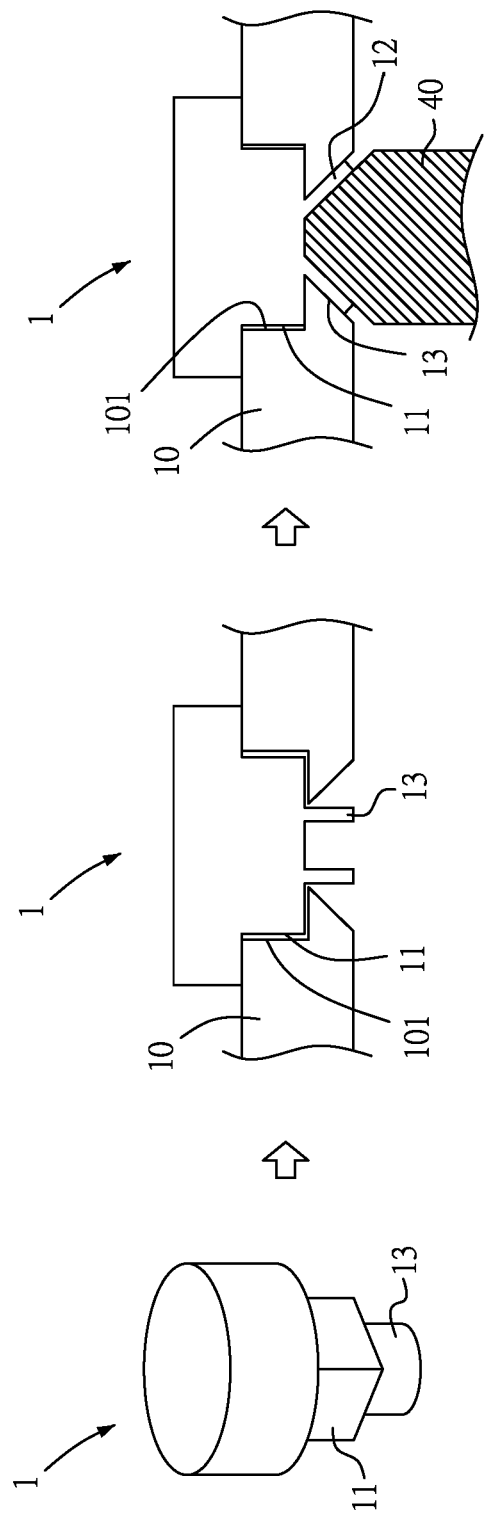
FIG. 13 is a schematic view of an assembling state of an eighth embodiment of the present disclosure.

As shown in FIG. 13, in addition to the above embodiment, in one embodiment of the present disclosure, the anti-rotation structure 1 is put into the object 10 with the anti-rotation portion 11, and the pressure is applied to the pressure applying portion 13 with the tool 40, and the material entering portion 12 can be formed when the pressure applying portion 13 is deformed and thickened, so that the pressure applying portion 13 is deformed to form the material entering portion 12 to be limited or engaged at the object 10, and thus the anti-rotation structure 1 is firmly disposed at the object 10.

In addition to the above embodiment, in one embodiment of the present disclosure, the anti-rotation structure 1 is disposed at the corresponding anti-rotation portion 101 of the object 10 with the anti-rotation portion 11, and the pressure is applied to the pressure applying portion 13 with the tool 40, so that the pressure applying portion 13 is deformed to be limited or engaged at the object 10, and thus the anti-rotation structure 1 is firmly disposed at the object 10.

While the present invention has been described by means of preferable embodiments, those skilled in the art should understand the above description is merely embodiments of the invention, and it should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. An assembling method of an anti-rotation structure, the anti-rotation structure comprises at least one anti-rotation portion, a material entering portion and a pressure applying portion, wherein the anti-rotation portion is one flat plane and is located on one side of the anti-rotation structure, the flat plane has a cross-sectional outline of the material entering portion and the pressure applying portion, pressure is applied to the pressure applying portion by an external force, so that material of an object enters or flows into the material entering portion, and the anti-rotation portion is used to anti-rotate with the object.

2. The assembling method of the anti-rotation structure according to claim 1, wherein the material entering portion is provided with a prevention portion, or the prevention portion is used to prevent the material of the object from flowing out, protruding, overflowing, extruding from the material entering portion or restrict a storage position of the material of the object.

3. The assembling method of the anti-rotation structure according to claim 1, wherein the pressure applying portion is greater than the material entering portion, or the pressure applying portion is greater than a prevention portion of the material entering portion, or the prevention portion is greater than the material entering portion, or the scope of the anti-rotation portion covers a part of the pressure applying portion, the material entering portion, the prevention portion or a part of the prevention portion.

4. The assembling method of the anti-rotation structure according to claim 1, wherein the anti-rotation structure is first disposed at the object with the material entering portion, and then an element is combined to a connecting portion of the anti-rotation structure, wherein the element and the connecting portion produce a force when combined.

5. The assembling method of the anti-rotation structure according to claim 1, wherein the anti-rotation structure is first disposed at the object with the material entering portion, and then an element is combined to a connecting portion of the anti-rotation structure, wherein the connecting portion is a threaded portion, the element and the connecting portion produce a force when combined by rotationally locking, and the force is resisted with the anti-rotation portion, so that the anti-rotation structure can achieve anti-rotation.

6. The assembling method of the anti-rotation structure according to claim 1, wherein the anti-rotation structure is first disposed at the object with the material entering portion, and then an element is combined to a connecting portion of the anti-rotation structure by fastening or abutting, wherein the element and the connecting portion produce a force when combined by fastening or abutting, and the force is resisted with the anti-rotation portion of the anti-rotation structure.

7. The assembling method of the anti-rotation structure according to claim 1, wherein the anti-rotation structure is put into the object with the anti-rotation portion, and the pressure is applied to the pressure applying portion, so that the pressure applying portion is deformed to be limited or engaged at the object.

8. The assembling method of the anti-rotation structure according to claim 1, wherein the anti-rotation structure is first disposed at a corresponding anti-rotation portion of the object with the anti-rotation portion, and then the pressure is applied to the pressure applying portion, so that the pressure applying portion is deformed to be limited or engaged at the object.

* * * * *